UNITED STATES PATENT OFFICE.

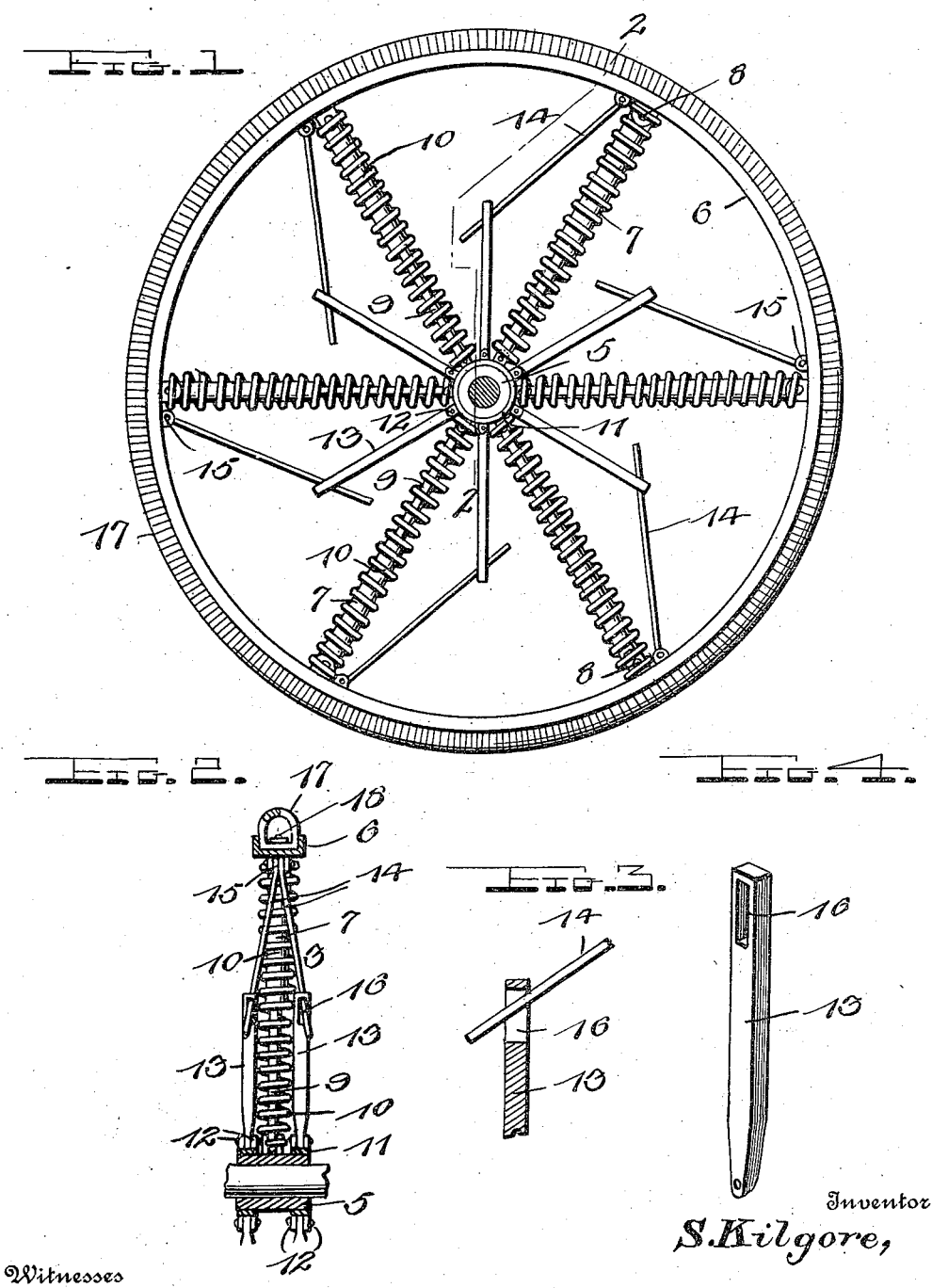

STARLING KILGORE, OF CROSBY, TEXAS.

SPRING-WHEEL.

1,046,606.

Specification of Letters Patent. Patented Dec. 10, 1912.

Application filed July 20, 1912. Serial No. 710,719.

*To all whom it may concern:*

Be it known that I, STARLING KILGORE, a citizen of the United States, residing at Crosby, in the county of Harris and State of Texas, have invented certain new and useful Improvements in Spring-Wheels, of which the following is a specification, reference being had to the accompanying drawings.

This invention relates to spring wheels and has for its object to provide a wheel of this character wherein a maximum of resiliency or shock absorbing power is obtained, with the employment of comparatively few elements, whereby great durability and efficiency in operation is also obtained.

A further object of the invention resides in the provision of a spring wheel having a plurality of spokes each consisting of telescoping sections and a coil spring arranged on the spoke sections between the rim and hub of the wheel and normally holding the spokes in distended position, and additional means for eliminating lateral strains upon the wheel in the turning movement thereof or when the same strikes obstructions in the road.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of a spring wheel constructed in accordance with the present invention; Fig. 2 is a section taken on the line 2—2 of Fig. 1; Fig. 3 is a detail longitudinal section through the engaged ends of the bracing spoke sections. Fig. 4 is an enlarged detail perspective view of one of the bracing spoke sections.

Corresponding and like parts are referred to in the following description and designated in the accompanying drawing by like reference characters.

Referring in detail to the drawing 5 designates the hub of the wheel and 6 the rim thereof. To the rim of the wheel a plurality of inwardly extending spoke sections 7 are pivotally connected as shown at 8. A plurality of inner spoke sections 9 are pivotally mounted at one of their ends centrally upon the periphery of the hub 5, and are telescopically engaged at their outer ends in the tubular spoke sections 7. Coil springs 10 surround the spoke sections 7 and 9 and bear against the hub and rim of the wheel at their inner and outer ends respectively.

Upon each end of the hub 5 an annulus 11 is secured and is provided with a plurality of pairs of spaced ears 12 between which the inner ends of the sections 13 of the bracing spokes are pivotally mounted. These bracing spokes are arranged upon each side of the main wheel spokes and include the outer sections 14 which are pivotally mounted at their outer ends as at 15 upon the rim 6 of the wheel. The inner ends of these sections 14 of the bracing spokes are loosely disposed through the loops or elongated eyes 16 upon the outer ends of the inner spoke sections 13.

By means of the above construction it will be readily observed that in the downward movement of the wheel hub by pressure of the load thereon, the main spoke sections 9 below the horizontal axis of the hub will move into the tubular spoke sections 7, the springs 8 being placed under compression. In this movement of the hub, the engaged ends of the bracing spoke sections 13 and 14 slide freely upon each other. These sections of the bracing spokes it will be observed are disposed at an angle with relation to each other and out of the plane of the main wheel spokes. Thus the bracing spokes upon one side of the wheel and above the plane of the hub will bind upon each other at their engaged ends and limit the compression of the coil springs 10, thus obviating liability of breakage of the same and also relieving the main spokes of lateral strains, which would otherwise devolve thereon in the turning movement of the wheel.

The rim 6 of the wheel is preferably of channel form in cross section and is adapted to receive the tire 17. This tire consists of a continuous closely coiled steel spring which is secured to the rim of the wheel at intervals by means of screws or bolts, indicated at 18. This spring tire renders the wheel noiseless in its movement, and greatly increases the shock absorbing qualities thereof. A tire of this construction is also extremely durable, and the annoyance of frequent punctures, as is the case in the ordinary pneumatic tire, is eliminated.

From the foregoing it is thought that the construction and manner of operation of my improved spring wheel will be clearly understood. As the same consists of comparatively few elements of simple construction, it will be obvious that the entire wheel can be produced at small cost. It is of course obvious that the size and strength of the springs 10 upon the wheel spokes will be regulated in accordance with the weight to be sustained by the wheel. It will further be understood that while I have shown and described the preferred construction and arrangement of the various elements, the invention is susceptible of considerable modification without departing from the essential features or sacrificing any of the advantages thereof.

Having thus described the invention what is claimed is:

In a spring wheel, the combination with the wheel hub and rim, of a plurality of telescopically engaged spoke sections carried by the hub and rim respectively, and a plurality of bracing spokes each consisting of inner and outer sections pivotally mounted upon the hub and rim respectively of the wheel, at opposite ends of the main spokes, said bracing spoke sections being angularly disposed with relation to the main spokes and with relation to each other and disposed upon corresponding sides of the respective main spokes of the wheel, the opposed ends of said bracing spoke sections being slidably engaged with each other.

In testimony whereof I hereunto affix my signature in the presence of two witnesses.

STARLING KILGORE.

Witnesses:
H. T. HARVEY,
J. C. RYAN.

Copies of this patent may be obtained for five cents each, by addressing the "Commissioner of Patents, Washington, D. C."